United States Patent [19]

Jaccard

[11] 4,310,219

[45] Jan. 12, 1982

[54] LIGHT DIFFUSING SURFACE STRUCTURE FOR A LIGHT GUIDE IN AN INFORMATION DISPLAY

[75] Inventor: Pierre-Ernest Jaccard, Bienne, Switzerland

[73] Assignee: Societe Suisse pour l'Industrie Horlogere Management Services S.A., Bienne, Switzerland

[21] Appl. No.: 133,757

[22] Filed: Mar. 25, 1980

[30] Foreign Application Priority Data

Apr. 13, 1979 [FR] France ............................ 79 10414

[51] Int. Cl.³ .................... G02B 27/00; G02B 5/02
[52] U.S. Cl. ................................. 350/321; 350/167; 350/334
[58] Field of Search ............... 350/96.10, 188, 127, 350/128, 167, 321; 340/234

[56] References Cited

U.S. PATENT DOCUMENTS

| 2,716,919 | 9/1955 | Beard | 350/127 |
| 3,840,695 | 10/1974 | Fischer | 358/61 |
| 4,043,636 | 8/1977 | Eberhardt et al. | 350/160 |

FOREIGN PATENT DOCUMENTS

| 1285829 | of 0000 | France |  |
| 2181010 | of 0000 | France |  |
| 2317720 | of 0000 | France |  |
| 2353920 | of 0000 | France |  |
| 608165 | of 0000 | Switzerland |  |
| 14721 | of 1913 | United Kingdom |  |
| 118269 | 1/1919 | United Kingdom |  |
| 652694 | 5/1951 | United Kingdom | 350/128 |
| 662689 | 12/1951 | United Kingdom | 350/127 |
| 851217 | 10/1960 | United Kingdom | 20/3 |

OTHER PUBLICATIONS

*IBM Technical Disclosure Bulletin*, vol. 15, No. 8, Jan. 1973, pp. 2435-2436; entitled "Combination Reflective/Transmissive Liquid Crystal Display".

*Primary Examiner*—John K. Corbin
*Assistant Examiner*—B. W. de los Reyes
*Attorney, Agent, or Firm*—Griffin, Branigan & Butler

[57] ABSTRACT

A light diffusing surface structure is provided for a light guide in a passive information display wherein the surface geometry of regular texture is formed by portions of circular cylinders having their axes parallel to the general plane of the surface such cylinder portions intersecting one another at angles of 60° or 90° and producing a continuous diffusion at any angle of vision.

7 Claims, 10 Drawing Figures

LIGHT DIFFUSING SURFACE STRUCTURE FOR A LIGHT GUIDE IN AN INFORMATION DISPLAY

BACKGROUND OF THE INVENTION

This invention concerns information display instruments such as for instance watches, hand held calculators, instrument panels in vehicles and more particularly the display itself.

The present tendency in this field is toward the adoption of passive displays, in particular liquid crystals. The passive character thereof comes from the fact that such displays do not emit light and they are thus invisible and so non readable in darkness. It is thus necessary to arrange for illuminating means for the display such as an incandescent lamp, an electroluminescent diode or a phosphorescent material activated by tritium.

In the case of small instruments such as watches it is essential to economize the energy and thus to obtain the maximum efficiency in the illumination of the display. Different systems have been proposed in order to guide the light emitted by a source through utilisation of the phenomena of reflection and refraction and in order to diffuse the light at the level of the surface placed under the display according to an appropriate visual angle for the user. These guides generally are basically formed by a thin plate of which the major surface is provided with a structure intended to diffuse light. The surface structures as presently known may be classed in two distinct groups each having its own particular disadvantages.

The first group includes random structures obtained by procedures themselves of a random nature such as for instance abrasion or chemical etching of the surface. They generally provide a fine texture of which the grain is not visible to the naked eye. However they have the major disadvantage that all small defects as for instance dust grains which may be present in the optical system are clearly visible by the observer which is not only rather annoying for the reading but spoils the esthetic effect. An example of such a surface structure is described in the Swiss Pat. No. 589 306.

The second group includes structures having a periodic or regular character obtained by repetitive procedures such as for instance mechanical machining. Such structures generally provide a coarse but regular texture which is perfectly visible to the naked eye. They have not the disadvantage shown up earlier in respect of the first group but present a further disadvantage which is that of not diffusing light coming from the guide except in certain particular directions with opening angles very restrictive and insufficient concerning the necessary visual angle for easy reading.

SUMMARY OF THE INVENTION

The invention proposes to overcome the disadvantages of the first group through the adoption of a regular structure and thus belongs to the second group but however avoids the difficulties related to the known structures of this group as mentioned above, whilst at the same time preserving the advantages of this group. It is essentially characterized through the utilisation of portions of cylindrical surfaces of circular section which enables the production of a continuous diffusion of light usable at all visual angles.

DETAILED DESCRIPTION OF THE INVENTION

Figure 1:
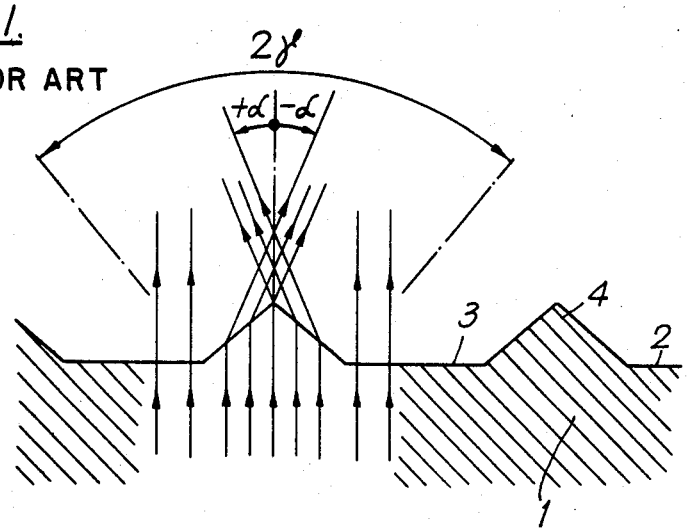
FIGS. 1 and 2 both illustrate the known state of the art employing a regular structure.
Figure 2:
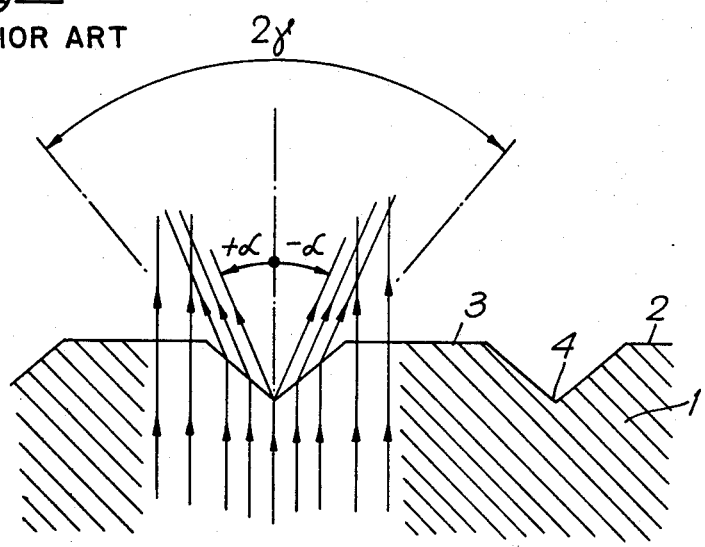

To facilitate understanding of the invention it is useful to consider the closest known state of the art (regular structure) as shown by FIGS. 1 and 2. One may see that the surface 2 of a light guide diffuser reflector 1 of the optical display system is generally formed of planar facets 3 limited by edges or notches of triangular section 4 which may be obtained through machining of the upper surface of plate 1 which serves as a light guide. The structures thus obtained, as already said, have the disadvantage of diffusing light coming from the source and transmitted by the guide selectively in preferred directions of angles $+\alpha$ and $-\alpha$. In order to permit an easy perception, thus easy reading, the useful light at the illumination of a display must be continuously diffused in the angle $2\gamma$ of the observer's vision which is not the case in the known state of the art.

The diffusing structure according to the invention presents the advantages of the preceding, that is to say defects of the guide such as dust grains are no longer visible but overcomes the difficulties due to an opening angle too limited. Effectively the structure proposed by the invention permits the obtaining of a continuous diffusion in all angles of vision $2\gamma$ of the useful light at the illumination of the display, thus readable during night time. Moreover it gives a regular textured aspect at the base of the display which covers up the defects already mentioned and is further effective to diffuse reflection of ambiant light for day time reading.

Figure 3:
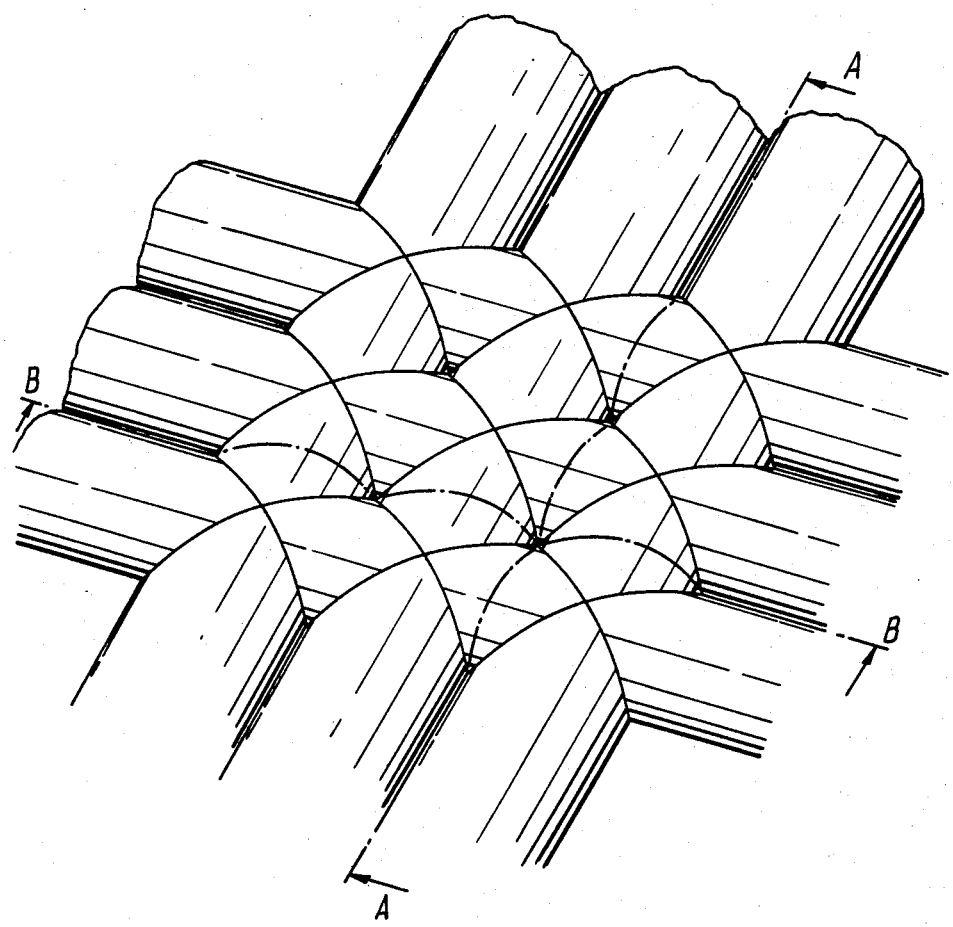
FIG. 3 shows a first example of a surface according to the invention.
Figure 4:
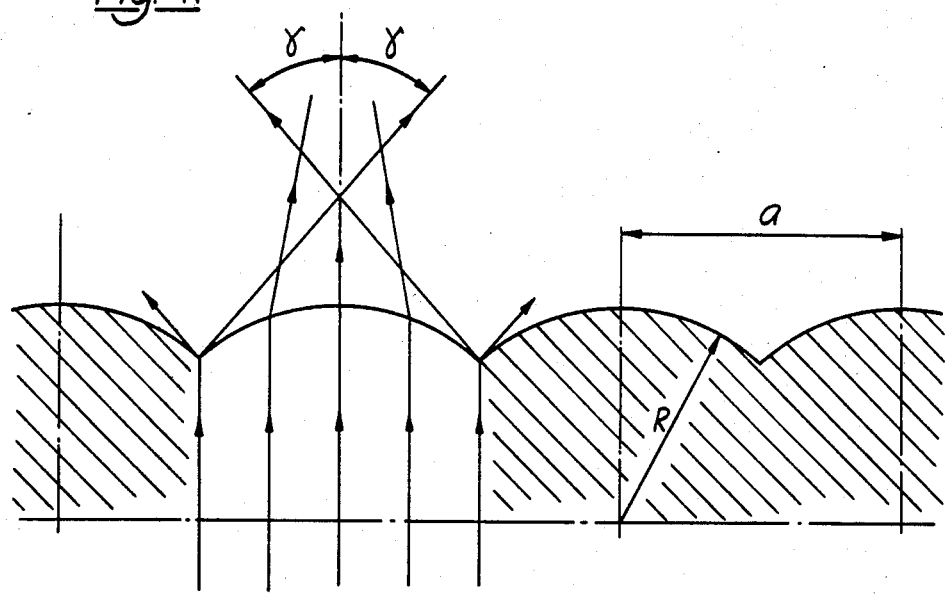
FIG. 4 shows a cross section of this first example.
Figure 6:
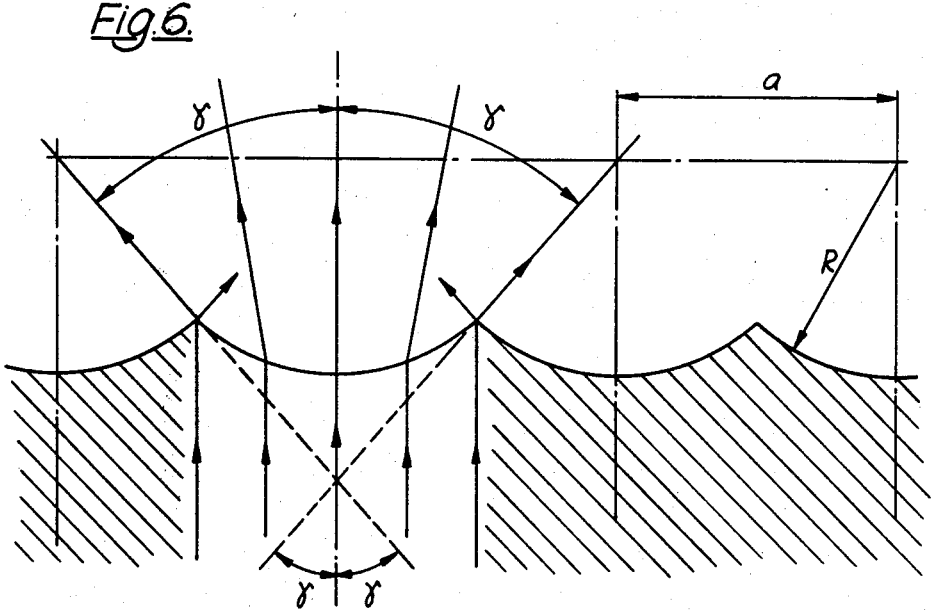
FIG. 6 shows a cross section of another profile according to the invention.
Figure 5:
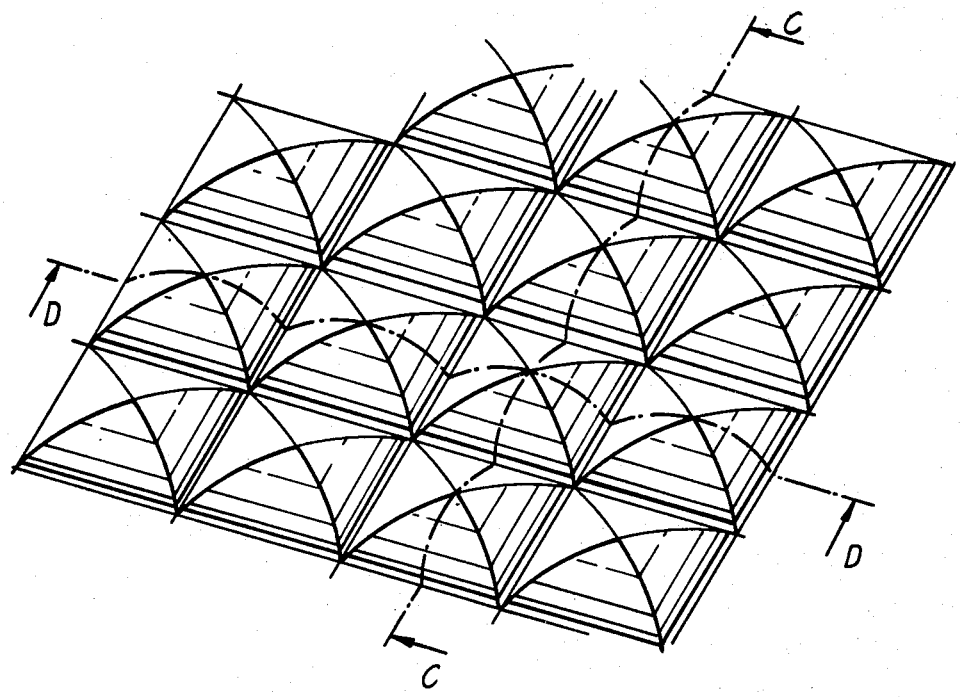
FIG. 5 shows a second example of the invention.

The invention is characterized through the employment of portions of surfaces no longer planar but cylindrical and of circular cross section. FIG. 3 shows a first example thereof. One is here in the presence of an intersecting network of two families of convex cylindrical surfaces of radius R, intersecting at 90° between axes a. A cross section of this surface structure according to cuts A—A and B—B shows a profile as represented in FIG. 4. A second example is illustrated by FIG. 5. A section along cuts C—C and D—D presents the same profile shown in FIG. 4. Here again the concern is with portions of convex circular cylindrical surfaces intersecting at 90° but the two families of surfaces are united in a different manner from those of the example of FIG. 3. FIG. 6 presents a further profile which may be utilised in a network of families of concave cylindrical surfaces. The surface profiles of FIGS. 4 and 6 are complementary and are equally perfectly utilisable according to the invention. The result as to the final aspect will be however slightly different, from the fact that one has in the first case optically convergent interfaces while in the second case one is confronted with optically divergent interfaces.

The obtaining of such diffusing surface structures essentially calls on known techniques of injection moulding of transparent materials such as for instance certain acrylic resins, in a mould of which the surface will have a structure complementary to that which one wishes to obtain. The structures as represented in FIGS. 3 and 5 could also be those of an injection mould either convex or concave. The structures obtained of the moulded component will thus be the complement of those of the mould itself, different from the representations of FIGS. 3 and 5. There is a complement relation between the two surface profiles of FIGS. 4 and 6, the one representing that of the mould of the other and vice versa.

Figure 7:
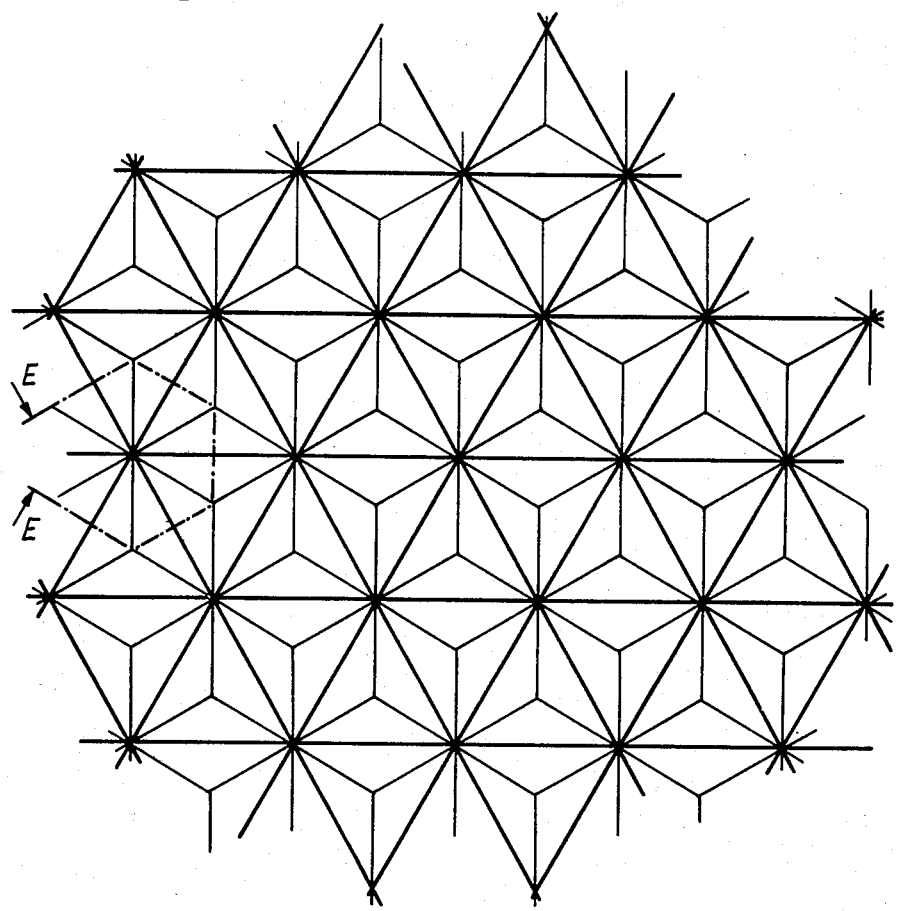
FIG. 7 shows a plan view of a third example of the invention.

FIG. 7 represents in plan a further example according to the invention. According to the partial section E—E, one has the same surface profile as in FIGS. 4 and 6. The difference relative to the representations of FIGS. 3 and 5 comes from the fact that here one is concerned with a network of cylindrical circular surfaces in three directions which intersect at 60°.

Figure 8:
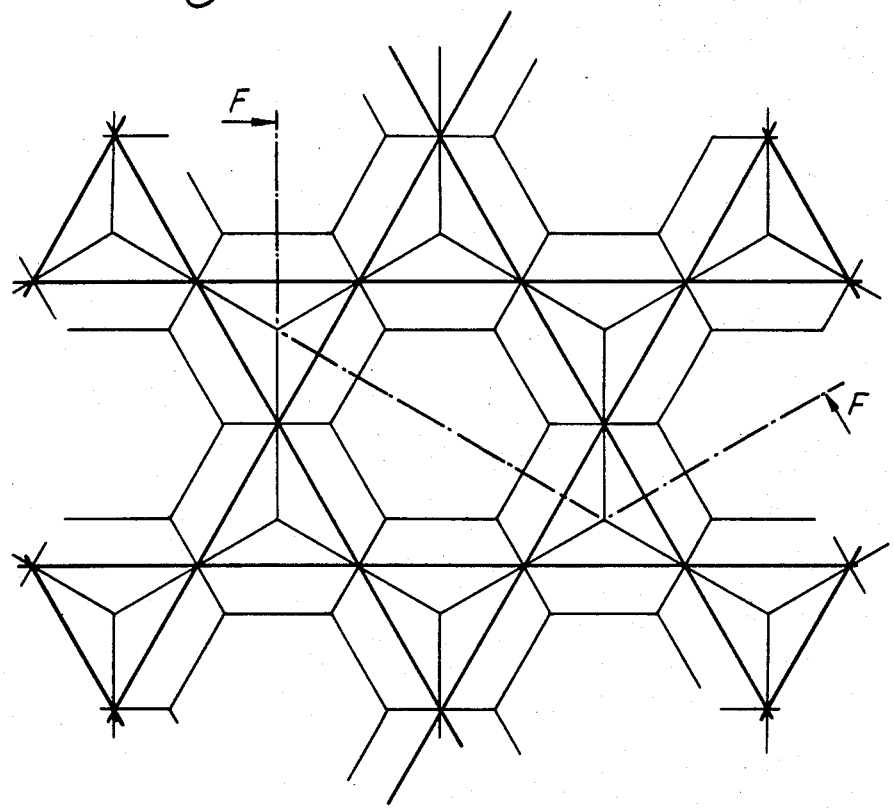
FIG. 8 is a variant of FIG. 7 in which two out of three of the cylindrical surfaces are omitted.
Figure 9:
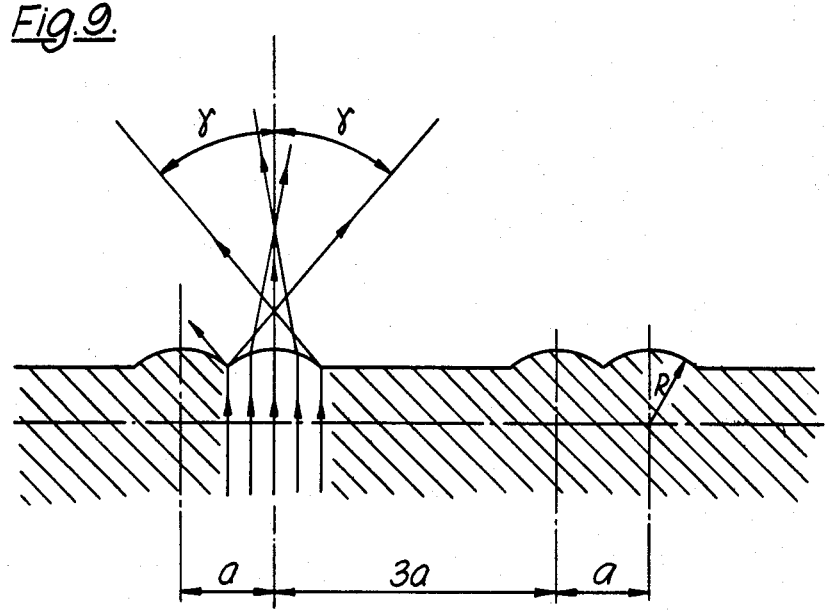
FIGS. 9 and 10 show the profiles obtained with the FIG. 8 variant.
Figure 10:
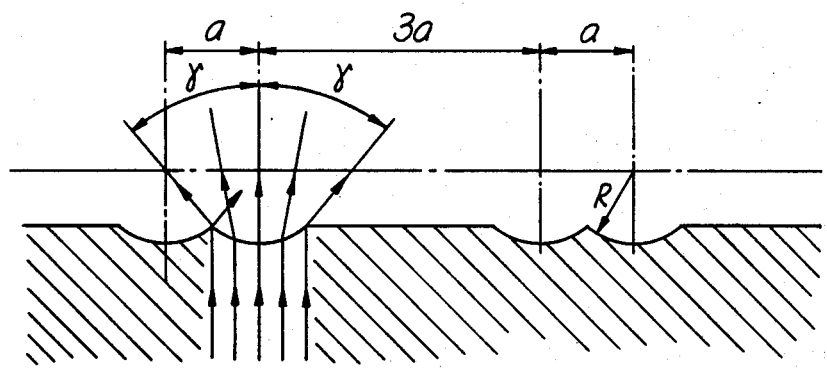

FIG. 8 presents in plan the aspect of a structure derived from the preceding when in each one of three families of cylindrical surfaces two out of three surfaces are omitted which leaves planar facets in the general orientation plane of the upper face of the light guide. One thus obtains according to the partial cut F—F a profile as shown in FIGS. 9 or 10 according to whether the surface is to be concave or convex. Here again there is complement relation between the two types of surface profiles, each one representing the mould of the other.

It is evident that in the case of structures formed of families of cylindrical surfaces intersecting at 90° just as with those intersecting with 60° it is possible to derive from the teaching of the present invention other textures than those given in example, through omitting one or several cylindrical surfaces and arranging those which are kept in such a manner as to provide different combinations.

The geometrical parameters defining the chosen profile for the diffusing surface of the guide are three: R, radius of the portions of the circular cylindrical surfaces, a, step of distance separating the axes of two contiguous cylinders and $2\gamma$, corresponding to the maximum angle of diffusion of light coming from the guide and the angle of vision desired. These parameters are chosen for correct vision and a sufficient fineness of texture of the diffusing structure used. They are united by the relation:

$$\gamma = \text{Arc sin}\left(\frac{n_1}{n_0} \cdot \frac{a}{2R}\right) - \text{Arc sin}\left(\frac{a}{2R}\right)$$

$n_1$ being the index of refraction of the material constituting the light guide for the light used and $n_0$ the index of refraction of the exterior surroundings, thus 1.00 for air.

One may readily determine that in order to have effective emergence of light it is necessary that:

$$\frac{n_1}{n_0} \cdot \frac{a}{2R} \leq 1 \text{ thus: } \frac{a}{2R} \leq \frac{n_0}{n_1},$$

and the angle of diffusion $2\gamma$ is maximum when $(a/2R) = (n_0/n_1)$.

For a pleasing structural aspect a may be chosen between 0.10 and 1 mm and good vision is assured with $\gamma$ equal or superior to 40°.

In a practical example of a surface according to the invention, the guide being formed of polymethyl methacrylate (PMMA) of an index $n_1 = 1,491$ and in contact with the air, the maximum angle $\gamma$ that one may obtain is 47,88°. If one takes a step a of 0,25 mm and the radius R of 0,188 mm, one obtains $\gamma = 40,79°$ and thus an angle of vision $2\gamma$ approximately equal to 81,5°, this perfectly satisfying the demands of the invention.

Other values of geometrical parameters may evidently be chosen should one select other materials for the light guide.

What is claimed is:

1. A surface of generally planar form having a diffusing surface structure for a light guide in a passive information display, said diffusing surface structure being formed at least in part of portions of surfaces of linearly extending circular cylinders having their axes parallel to the general plane, said cylinder surfaces being arranged to belong to at least two families with axes parallel to one another among the surfaces of each family and non-parallel to the axes of the surfaces of another family.

2. A surface as set forth in claim 1 wherein said cylindrical surfaces are convex or concave in accordance with two families of axes regularly spaced, and the axes of each family being orthogonal to those of the other family.

3. A surface as set forth in claim 1 wherein the cylindrical surfaces are convex or concave in accordance with three families having axes parallel to one another in each family regularly spaced and cutting those of the other families at 60°.

4. A surface as set forth in claim 3 wherein within each family two out of three of the cylindrical surfaces are eliminated.

5. A surface as set forth in claim 1 wherein all cylindrical surfaces have the same radius of curvature.

6. A surface as set forth in claim 1 formed by plastic moulding.

7. A surface as set forth in claim 6 formed from polymethyl methacrylate (PMMA).

* * * * *